United States Patent
Martinez et al.

(10) Patent No.: US 12,290,089 B2
(45) Date of Patent: May 6, 2025

(54) NUT BUTTER COMPOSITION

(71) Applicant: General Mills, Inc., Minneapolis, MN (US)

(72) Inventors: Alexandra Martinez, St. Louis Park, MN (US); Emily Ryks, Maple Grove, MN (US); Chris Gordon, Victoria, MN (US); Cynthia Marcela Machado, Raleigh, NC (US)

(73) Assignee: General Mills, Inc., Minneapolis, MN (US)

( * ) Notice: Subject to any disclaimer, the term of this patent is extended or adjusted under 35 U.S.C. 154(b) by 1096 days.

(21) Appl. No.: 16/624,717

(22) PCT Filed: Jun. 21, 2017

(86) PCT No.: PCT/US2017/038445
§ 371 (c)(1),
(2) Date: Dec. 19, 2019

(87) PCT Pub. No.: WO2018/236365
PCT Pub. Date: Dec. 27, 2018

(65) Prior Publication Data
US 2020/0120964 A1 Apr. 23, 2020

(51) Int. Cl.
*A23L 25/10* (2016.01)
*A23D 7/005* (2006.01)
*A23D 9/007* (2006.01)
*A23L 25/00* (2016.01)
*A23L 29/10* (2016.01)
*A23L 29/212* (2016.01)
*A23P 20/20* (2016.01)

(52) U.S. Cl.
CPC .............. *A23L 25/10* (2016.08); *A23D 7/005* (2013.01); *A23D 9/007* (2013.01); *A23L 25/30* (2016.08); *A23L 29/10* (2016.08); *A23L 29/212* (2016.08); *A23P 20/20* (2016.08)

(58) Field of Classification Search
None
See application file for complete search history.

(56) References Cited

U.S. PATENT DOCUMENTS

| 3,044,883 | A | | 7/1962 | Ferguson |
| 3,184,319 | A | * | 5/1965 | Fritsche ............... B65D 75/322 426/115 |
| 3,950,568 | A | * | 4/1976 | Parker ..................... A23L 25/10 426/633 |
| 3,978,246 | A | | 8/1976 | Chozianin et al. |

(Continued)

OTHER PUBLICATIONS

Shakerardekani: Textural, Rheological and Sensory Properties and Oxidative Stability of Nut Spreads—A Review; Int. J. Mol. Sci. 2013, 14, 4223-4241; doi:10.3390/ijms14024223. (Year: 2013).*

(Continued)

*Primary Examiner* — Patricia A George
(74) *Attorney, Agent, or Firm* — Jordan IP Law, LLC; Rachel A. Kahler

(57) ABSTRACT

Nut butter-based compositions having a novel texture are provided herein. A composition provided herein includes a nut butter, a fat system, a sugar, and a firming agent. Methods of making a nut butter-based composition and food products that include a nut butter-based composition are also described.

13 Claims, 3 Drawing Sheets

Cold formed nut butter composition sheet

(56) References Cited

U.S. PATENT DOCUMENTS

| | | | |
|---|---|---|---|
| 4,160,850 | A | 7/1979 | Hallstrom et al. |
| 4,341,814 | A | 7/1982 | McCoy |
| 5,240,726 | A * | 8/1993 | Zook .................. A23G 3/343 |
| | | | 426/607 |
| 5,549,923 | A * | 8/1996 | Finnochiaro .......... A23L 29/212 |
| | | | 426/633 |
| 6,039,999 | A | 3/2000 | Bakshi et al. |
| 8,697,173 | B2 * | 4/2014 | Thaler .................. A23L 25/10 |
| | | | 426/633 |
| 2002/0037356 | A1 | 3/2002 | Wong et al. |
| 2004/0081744 | A1 * | 4/2004 | Liu ..................... A23L 25/10 |
| | | | 426/633 |
| 2006/0019021 | A1 | 1/2006 | Plank et al. |
| 2006/0045937 | A1 | 3/2006 | Slesinski et al. |
| 2007/0042107 | A1 | 2/2007 | Kenneth et al. |
| 2008/0081092 | A1 | 4/2008 | Garter et al. |
| 2013/0142975 | A1 * | 6/2013 | Wallace .................. B32B 7/06 |
| | | | 428/36.7 |

OTHER PUBLICATIONS

Kaar: Development and analysis of multi-nut spread for children aged between 7-9 years; International Journal of Food Science and Nutrition ISSN: 2455-4898 Impact Factor: RJIF 5.14 www.foodsciencejournal.com vol. 3; Issue 2; Mar. 2018; p. 44-48. (Year: 1018).*

Pepper: Determination of Moisture in Peanut Butter; Tiie Journal of the American Oil Chemists' Society, Aug. 1953. (Year: 1953).*

Karl F. Tiefenbacher: Book: Wafer and Waffle Processing and Manufacturing: Chapter Two—Technology of Main Ingredients—Water and Flours; Academic Press, 2017, pp. 15-121, ISBN 9780128094389; eBook, English, May 2017. (Year: 2017).*

See Wikipedia: Sugar; published online at least by May 31, 2017 at: https://web.archive.org/web/20170531123545/https://en.wikipedia.org/wiki/Sugar (Year: 2017).*

Clarke: The Science of Ice Cream. Royal Society of Chemistry; published 2004—by the Royal Science of Chemistry; 187 pages. (Year: 2044).*

* cited by examiner

NUT BUTTER COMPOSITION

CROSS-REFERENCE TO RELATED APPLICATIONS

This application represents a National stage application of PCT/US2017/038445, filed Jun. 21, 2017, entitled "Nut Butter Composition", pending. The entire content of this application is incorporated by reference.

BACKGROUND

Nut butters are typically pastes made from grinding tree or ground nuts. They are often eaten alone or used as spreads or as ingredients in various foods, including snacks and sauces. Nut butters can contribute a nutty flavor to foods, whether sweet or savory. Nut butters can also contribute plant-based protein to food products, which is frequently a characteristic desired by consumers. Consumers often enjoy new ways of incorporating nut butters into foods, and desire convenient foods that include nut butters.

SUMMARY

The present disclosure relates to a nut butter composition with favorable handling characteristics.

Nut butter-based compositions having a putty-like texture are provided herein. A composition has a moisture content of less than 1% by weight and includes a nut butter in an amount of from about 25% to about 70% by weight of the composition, a fat system in an amount of from about 5% to about 20% by weight of the composition, a sugar in an amount of from about 15% to about 30% by weight of the composition, and a firming agent in an amount of from about 10% to about 55%. A composition herein can have a texture with a firmness of from 1.68 to 2.47 kg, stickiness of from −0.48 to −0.35 kg, as measured by a partial-penetration texture analysis test.

In some embodiments, a fat system in a composition provided herein can include a fat having a melting point of from about 38° C. to about 48° C. in an amount of from about 10% to about 18% by weight of the composition, and a fat having a melting point of from about 50° C. to about 60° C. in an amount of from about 1% to about 4% by weight of the composition.

In some embodiments, a firming agent in a composition provided herein can include a starch.

In some embodiment, a sugar in a composition provided herein includes a liquid sugar in an amount of up to 4% by weight of the composition.

In some embodiments, a composition provided herein can include an emulsifier.

In some embodiments, a composition provided herein can have a viscosity of from 35 to 45 as measured at 50° C. using a #27 spindle on a Brookfield Viscometer set at 50 rpm for 3 minutes and 20 rpm for 15 seconds.

Also provided are food products that include a nut butter-based composition provided herein.

In some embodiments, a food product provided herein include a layer of a nut butter-based composition provided herein. In some embodiments, a food product provided herein can include a fat-based coating on at least a portion of a surface of a nut butter-based composition layer, where the fat-based coating includes a wicking agent.

Methods of making a multi-layered food product are also provided. A method of making a multi-layered food product include heating at least one surface of a first layer of a nut butter-based composition provided herein at a temperature and time sufficient to make the at least one surface tacky, applying a second edible layer to the tacky upper surface with sufficient pressure to adhere the second layer to the at least one surface of the first layer, and allowing the first and second layers to cool to room temperature to make the multi-layered food product.

In some embodiments of a method of making a multi-layered food product, the second edible layer can be a grain-based layer.

In some embodiments of a method of making a multi-layered food product, the method can further include a step of applying a fat-based coating to at least a portion of a second surface of the first layer, the fat-based coating including a wicking agent.

These and various other features and advantages will be apparent from a reading of the following detailed description.

DETAILED DESCRIPTION

Figure 1:
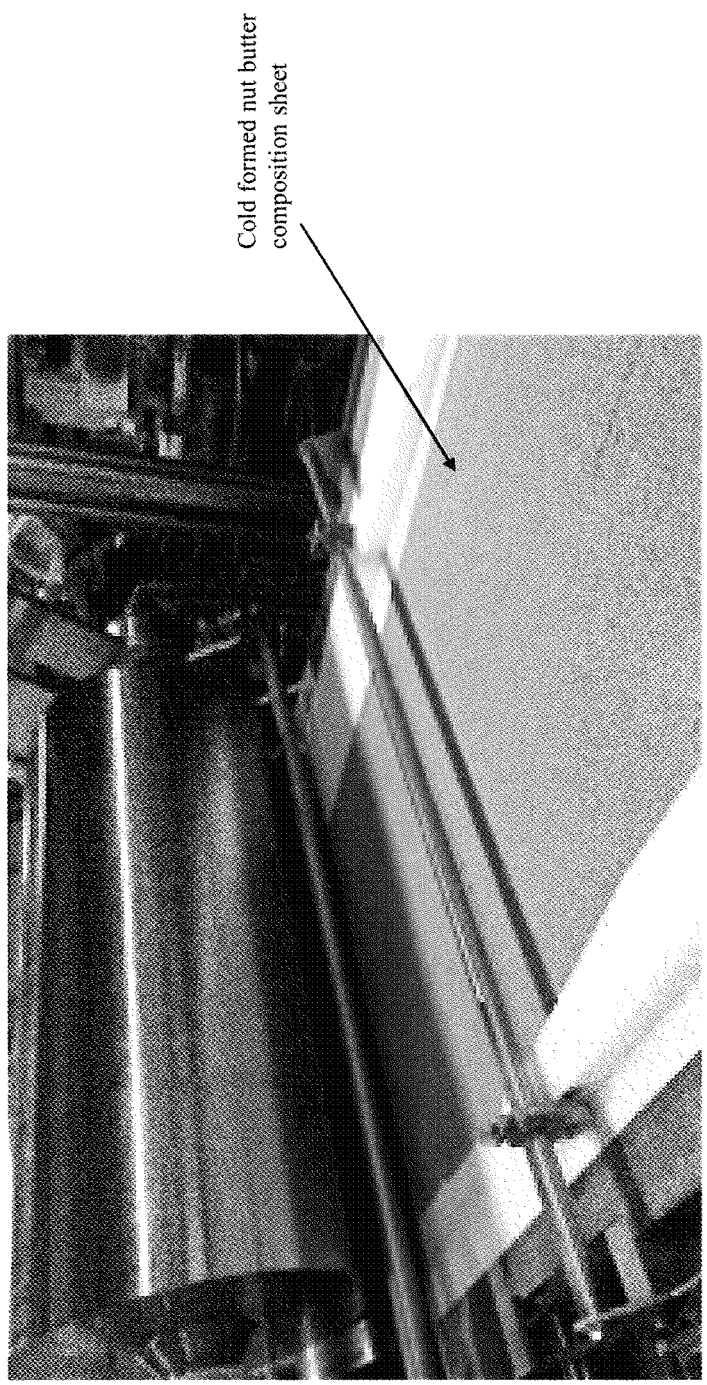
FIG. 1 shows an embodiment of a composition provided herein sheeted using a cold forming technique.

Consumers enjoy nut butters in various snack foods. However, nut butters tend to have poor handling characteristics for manufacturing, handling, and storing shelf stable snacks. It has been discovered, and is disclosed herein, a nut butter-based composition with unique handling characteristics. A composition provided herein has a unique putty-like texture that allows it to be readily formed using various techniques, yet firm enough to retain its formed shape at room temperature. A composition provided herein, thus, can be handled and formed in ways that previous nut butter-based products have not been able to be handled and formed, while still providing a nut butter-like eating experience.

A composition provided herein includes a nut butter in an amount of from about 25% to about 70% (e.g., from about 30% to about 60%) by weight of the composition. A "nut butter," as used herein, refers to a paste made from grinding nuts (e.g., peanuts, almonds, cashews, macadamia nuts, walnuts, and the like). In some embodiments, a nut butter, as used herein can also include a combination of a nut paste, as described above, and a nut flour. A nut butter can include up to 35% of a nut flour.

A composition provided herein also includes a fat system in an amount of from about 5% to about 25% (e.g., from about 9% to about 20%) by weight of the composition. A "fat system," as used herein, refers to an edible fat or a combination of edible fats. A fat system suitable for use herein can include one or more fat that is solid at 20° C. In some embodiments, a fat system includes a hard stock fat (i.e., a fat having a melting point of 48° C. or higher, e.g., from about 50° C. to about 60° C.). Examples of hard stock fats include high melting point vegetable oil fractions (e.g., palm stearin fraction), interesterified fats (e.g., interesterified palm oil), fully hydrogenated fats (e.g., fully hydrogenated soy oil, fully hydrogenated palm oil, and the like), and combinations thereof. In some embodiments, a fat system includes a fat having a melting point of from about 35° C. to about 48° C. (e.g., from about 38° C. to about 45° C.). Fats having a melting point of from about 38° C. to about 48° C. can be any edible fat with the appropriate melting point, including without limitation, vegetable oil fractions (e.g., palm or coconut midfractions), whole fats (e.g., palm oil or lard), interesterified fats, and combinations thereof.

In some embodiments, a composition provided herein can include a fat system with both a hard stock fat and a fat having a melting point of from about 35° C. to about 48° C. For example, a composition provided herein can comprise a fat system including a hard stock fat in an amount of from about 1% to about 4% by weight of the composition and a fat having a melting point of from about 38° C. to about 48° C. in an amount of from about 10% to about 18% by weight of the composition.

In some embodiments, a fat system in a composition provided herein can include an oil that is liquid at 20° C. (e.g., soy oil, sunflower oil, olive oil, canola oil, or the like). In some embodiments, a liquid oil may be combined with a hard stock fat and/or a firming agent described below to provide a desired nutritional attribute and/or texture attribute of a composition provided herein. For example, a liquid oil may be used in order to reduce the amount of saturated fat in a composition provided herein.

A composition provided herein includes sugar in an amount of from about 15% to about 30% (e.g., from about 20% to about 30%) by weight of the composition. Any appropriate sugar can be used, including without limitation, crystalline sugar (e.g., granulated or powdered sucrose), a liquid sugar (e.g., corn syrup, tapioca syrup, honey, or the like), or combinations thereof. In some embodiments, a composition provided herein can include a combination of a crystalline sugar with a liquid sugar. For example, a composition provided herein can include a crystalline sugar in an amount of from about 11% to about 26% (e.g., from about 18% to about 25%) by weight of the composition and a liquid sugar in an amount of up to about 4% (e.g., from about 1% to about 3%) by weight of the composition.

A firming agent is included in a composition provided herein in an amount of from about 10% to about 55% (e.g., from about 10% to about 30%) by weight of the composition. A "firming agent," as used herein, refers to an edible organic compound that has oil-binding characteristics. Examples of firming agents include starches (e.g., rice starch, potato starch, corn starch, and the like), protein (e.g., dried milk, whey protein concentrate or isolate, soy protein concentrate or isolate, and the like), fibers (e.g., oat fiber, corn fiber, and the like), and combinations thereof.

In some embodiments, a composition provided herein can include an emulsifier (e.g., a lecithin, mono- and diglycerides of fatty acids, and the like) in an amount of less than 2% (e.g., less than 1% or less than 0.5%) by weight.

A composition provided herein has a moisture content of less than 1%. In some embodiments, a composition provided herein is essentially anhydrous, containing only the water naturally found in the ingredients from which it is composed.

A composition provided herein can be made by combining the ingredients in any appropriate method and using any appropriate equipment. For example, in some embodiments, a nut butter ingredient can be warmed and combined with melted fats, followed by the remaining ingredients. In some embodiments, ingredients can be mixed in a high shear environment. In some embodiments, all or a portion of the sugar ingredient can be added as a final ingredient to help set structure. In some embodiments, ingredients can be combined in a hot melt system that mixes the ingredients and then controls crystallization using a tempering process.

At room temperature, a composition provided herein has a novel putty-like texture, which can be readily formed and hold its shape without support. The texture of a composition provided herein can be measured using a partial-penetration texture analysis test. A "partial-penetration texture analysis test," as used herein, is performed on a composition by placing sample of the composition that has been compressed 15 times using a tongue depressor (to simulate kneading a putty) into the bottom cone of a TA-425 TTC Spreadability Rig (Texture Technologies, Hamilton, Massachusetts, USA) and the bottom cone containing the sample is equilibrated to 22.5° C. to 22.7° C. for 5 hours prior to testing. Following equilibration, the bottom cone containing the sample is mounted on a TA.HDplus texture analyzer (Stable Micro Systems, Godalming, United Kingdom) equipped with a 250 kg load cell and the probe of the TA-425 TTC Spreadability Rig. The probe is lowered from a position 1 mm above the bottom cone 11 mm into the sample at a rate of 1 mm per second, followed by removal of the probe from the sample at a rate of 0.5 mm per second.

A partial-penetration texture analysis test measures at least peak positive force (also termed "firmness" herein, and measured in kg) and peak negative force (also termed "stickiness" herein, and measured in kg). In some embodiments, positive force area (also termed "firm work" herein, and measured in kg*sec) and/or negative force area (also termed "sticky work" herein, and measured in kg*sec) can also be measured using a partial-penetration texture analysis test. Peak positive force (also termed "firmness" herein, and measured in kg) and positive force area (also termed "firm work" herein, and measured in kg*sec) are measured during penetration by the probe of the sample using Exponent software (Stable Micro Systems). Peak negative force (also termed "stickiness" herein, and measured in kg) and negative force area (also termed "sticky work" herein, and measured in kg*sec) are measured during removal of the probe from the sample using Exponent software. Average peak positive force, average positive force area, average peak negative force, and average negative force area are calculated from triplicate samples.

A composition provided herein can have a firmness (i.e., peak positive force), as measured using a partial-penetration texture analysis test, of from 1.68 to 2.47 kg (e.g., from 1.88 to 2.28 kg). A composition provided herein can have a stickiness (i.e., peak negative force), as measured using a partial-penetration texture analysis test, of from −0.51 to −0.32 kg (e.g., from −0.48 to −0.35, or from −0.45 to −0.38).

In some embodiments, a composition provided herein can have a firm work (i.e., positive force area), as measured using a partial-penetration texture analysis test, of from 3.82 to 6.43 kg*sec (e.g., from 4.26 to 6 kg*sec, or from 4.69 to 5.56 kg*sec). In some embodiments, a composition provided herein can have a sticky work (i.e., negative force area), as measured using a partial-penetration texture analysis test, of from −2.51 to −1.79 kg*sec (e.g., from −2.39 to −1.91 kg*sec, or from −2.26 to 2.03 kg*sec).

In some embodiments, a composition can have a viscosity of from 35 to 45 as measured at 50° C. using a #27 spindle on a Brookfield Viscometer (Brookfield AMETEK, Middleboro, Massachusetts, USA) set at 50 rpm for 3 minutes and 20 rpm for 15 seconds.

As mentioned above, at room temperature, a composition provided herein has a novel putty-like texture, which can be readily formed and hold its shape without support. As a result of this texture, a composition provided herein can be formed in a variety of ways. For example, a composition provided herein can be cold formed into a sheet using a two roll former with rolls cooled to temperatures below 50° F., as shown in FIG. 1. In another example, a composition provided herein can be sheeted by using a melting system to melt the composition into a liquid that can then be deposited using any suitable equipment, such as but not limited to, a pressurized manifold, a smearing device, or liquid depositor, and then allowed to cool into a sheet.

In addition, the novel texture of a composition provided herein can allow the composition to be used in a food product without needing structural support from another component of the food product. For example, a composition provided herein can form a base layer on a layered snack bar, whereas prior nut butter-based compositions would need to be on an upper layer, typically layered between more solid components, such as cookies or covered with a compound coating to prevent smearing or sticking to packaging or to a consumer's hands.

A sheeted composition can be formed (e.g., cut or pinched) into smaller pieces of a desired shape (e.g., square sheets, rectangular pieces, oblong pieces, circular pieces, and the like). A sheeted composition can retain its shape in the absence of additional force being applied. In some embodiments, a sheeted composition is resistant to spreading when a force is applied, such as the application of a grain-based bar or a biscuit to a surface.

In another example, a composition provided herein can be formed by rolling into a desired shape (e.g., spheres, logs, and the like), and hold its shape in the absence of additional force being applied.

In some embodiments, a composition provided herein can have at least one surface heated to promote adhesion of another component (e.g., a grain-based bar, a cookie, a cracker, or the like) to the surface. Heating can be performed using any appropriate method sufficient to make the desired surface tacky. A surface temperature can be from about 95° F. to about 105° F. Once a surface is heated to produce a tacky surface, a component can be applied with sufficient pressure to cause adhesion of the composition surface and the component, and the layers can be allowed to cool to maintain adhesion. For example, a sheeted composition (i.e., a first layer) can have a surface heated using infrared heating on a surface before application of another component as a second layer, followed by cooling. In another example, a composition provided herein can be heated during sheeting to produce a first layer with at least one tacky surface and a component can be applied as a second layer to either surface of the sheet and sufficient pressure applied to cause adhesion of the two layers, followed by cooling.

In some embodiments, a component can be heated rather than a composition provided herein being heated before application of the component to a surface of the composition.

In some embodiments, a liquid component, such as a compound coating, can be applied to a surface of a composition provided herein and allowed to set. Suitable coatings include fat-based compound coatings, sugar-based coatings, and the like. In some embodiments, a coating can be a fat-based coating that contains a wicking agent that reduces oil migration from a composition provided herein. A wicking agent can be included in a coating in an amount of from about 5% to about 40% (e.g., from about 15% to about 30%). Suitable wicking agents include, for example, non-fat milk powder, whey protein, pea protein, soy protein, starches (e.g., corn starch, tapioca starch, rice starch, and the like), and the like.

A composition provided herein can be used in a food product. Examples of food products include, without limitation, snack bars, cookie cups, cookie, cracker, or biscuit sandwiches, snack bites, and the like. For example, a composition provided herein can be rolled into a ball and coated with a chocolate compound coating to make a snack bite. In another example, a composition provided herein can be layered with a compound coating and/or a granola bar to make a multilayered snack bar. In yet another example, a composition provided herein can be sandwiched between pretzel crackers to make a cracker sandwich.

A food product can be packaged for sale in any appropriate packaging. For example, a multilayered snack bar can be individually packaged in a foil-lined package.

Compositions and food products provided herein can have a shelf life at room temperature of at least 1 month (e.g., at least 3 months, or at least 1 year).

The following examples are provided to show selected embodiments of the invention described herein. The examples are not intended to limit the invention to any particular embodiment.

EXAMPLES

Example 1

Two nut butter compositions shown in Table 1 were made with similar handling characteristics. Formula A was made by heating and mixing the nut butter ingredient and fat system, followed by the addition of the firming agent and part of the sugar and mixing at high shear. The remainder of the sugar was then added and mixed in a dough mixer. Formula B was made using in a hot melt system that mixes the ingredients and then controls crystallization using a tempering process

TABLE 1

| Component | Formula A | Formula B |
|---|---|---|
| Nut butter | 48% by weight nut butter (33% of the butter from nut flour) | 35% by weight nut butter (12% of the butter from nut flour) |
| Fat system | 10% by weight hard stock + shortening | 16% by weight shortening |
| Sugar | 26% by weight granulated + liquid sugar | 23% by weight granulated sugar |
| Firming agent | 16% by weight non-fat dry milk | 24% by weight starch |

Example 2

Formula B from Table 1 was tested for firmness, firm work, stickiness, and sticky work using a partial-penetration texture analysis test. The results were compared to a control formulation that contained 40% sugar and no firming agent. Formula B had a putty like consistency, which could be readily shaped by hand and hold its shape without support. The control formulation felt adhesive in the hand and was more prone to deformation after shaping.

Firmness of Formula B ranged from 1.917 kg to 2.298 kg, with an average of 2.078 kg and a standard deviation of 0.197 kg. In contrast, the control formula firmness ranged from 1.12 kg to 1.298 kg, with an average 1.229 kg and a standard deviation of 0.096 kg.

Stickiness of Formula B ranged from −0.395 kg to −0.454 kg, with an average of −0.415 kg and a standard deviation of 0.033 kg. The control formula stickiness ranged from −0.246 kg to −0.265 kg, with an average of 0.258 kg and a standard deviation of 0.01 kg.

Firm work of Formula B ranged from 4.855 kg*sec to 5.631 kg*sec, with an average of 5.129 kg*sec and a standard deviation of 0.435 kg*sec. In contrast, the control formula firm work ranged from 2.353 kg*sec to 2.9 kg*sec, with an average 2.691 kg*sec and a standard deviation of 0.295 kg*sec.

Sticky work of Formula B ranged from −2.015 kg*sec to −2.25 kg*sec, with an average of −2.145 kg*sec and a standard deviation of 0.12 kg*sec. In contrast, the control formula sticky work ranged from −1.52 kg*sec to −1.645 kg*sec, with an average −1.574 kg*sec and a standard deviation of 0.064 kg*sec.

Example 3

Figure 2:
FIG. 2 shows an embodiment of a layered snack bar including a composition provided herein on an upper surface.

A first layered bar, shown in FIG. 2, was made by first sheeting a layer made of granola, nuts, and other particulates bound together using a pre-mixed syrup. The granola layer was topped with a nut butter composition using a hot melt method described above. The layers were allowed to cool until the nut butter layer firmed, then were cut into rectangular bars. A compound coating was then applied to the granola layer on the bottom of the bar. The three layered bar was cooled until the compound coating set.

Figure 3:
FIG. 3 shows another embodiment of a layered snack bar including a composition provided herein coated with a fat-based coating.

A second layered bar, shown in FIG. 3, was made by cold forming a nut butter composition using a cold forming technique described above. The upper surface of the nut butter sheet was then warmed using infrared heating and a chewy layer was pressed onto the warmed surface. The layers were allowed to cool until the chewy layer firmed, then were cut into rectangular bars. A compound coating was then applied to the nut butter layer on the bottom of the bar, and the three layered bar was cooled until the compound coating set.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A composition having a putty-like texture, the composition comprising:
   a nut butter in an amount of from about 25% to about 70% by weight of the composition,
   a fat system in an amount of from about 5% to about 20% by weight of the composition,
   a sugar in an amount of from about 15% to about 30% by weight of the composition, and
   a firming agent in an amount of from about 10% to about 55% by weight of the composition,
   wherein the composition has a firmness of from 1.68 to 2.47 kg, as measured by a partial-penetration texture analysis test, and a stickiness of from −0.48 to −0.35 kg, as measured by the partial-penetration texture analysis test.

2. The composition of claim 1, wherein the fat system includes
   a fat having a melting point of from about 38° C. to about 48° C. in an amount of from about 10% to about 18% by weight of the composition, and
   a fat having a melting point of from about 50° C. to about 60° C. in an amount of from about 1% to about 4% by weight of the composition.

3. The composition of claim 1, wherein the firming agent comprises a starch.

4. The composition of claim 1, wherein the sugar comprises a liquid sugar in an amount of up to 4% by weight of the composition.

5. The composition of claim 1, wherein the composition further comprises an emulsifier.

6. The composition of claim 1, wherein the composition has a viscosity of from 35 to 45 as measured at 50° C. using a #27 spindle on a Brookfield Viscometer set at 50 rpm for 3 minutes and 20 rpm for 15 seconds.

7. A food product, comprising a layer of a composition of claim 1, and including a fat-based coating on at least a portion of a surface of the layer, the fat-based coating including a wicking agent.

8. A method of making a multi-layered food product, the method comprising:
   a. heating at least one surface of a first layer of a composition at a temperature and time sufficient to make the at least one surface tacky, the composition having a putty-like texture, the composition including
      a nut butter in an amount of from about 25% to about 70% by weight of the composition,
      a fat system in an amount of from about 5% to about 20% by weight of the composition,
      a sugar in an amount of from about 15% to about 30% by weight of the composition, and
      a firming agent in an amount of from about 10% to about 55%,
      wherein the composition has a firmness of from 1.68 to 2.47 kg, as measured by a partial-penetration texture analysis test, and a stickiness of from −0.48 to −0.35 kg, as measured by the partial-penetration texture analysis test;
   b. applying a second edible layer to the tacky upper surface with sufficient pressure to adhere the second layer to the at least one surface of the first layer; and
   c. allowing the first and second layers to cool to room temperature to make the multi-layered food product.

9. The method of claim 8, wherein the second edible layer is a grain-based layer.

10. The method of claim 8, further comprising a step of applying a fat-based coating to at least a portion of a second surface of the first layer, the fat-based coating including a wicking agent.

11. The composition of claim 1, wherein the composition at room temperature holds its shape without support.

12. The composition of claim 11, wherein the composition at room temperature holds a sheet, sphere or log shape without support.

13. The composition of claim 1, wherein the nut butter and the fat system are distinct elements of the composition.

* * * * *